Dec. 16, 1952 C. E. MILLER 2,621,395
ADJUSTABLE END WORKING TOOL MECHANISM FOR LATHES
Original Filed Aug. 20, 1947 3 Sheets-Sheet 1

INVENTOR
CARROLL E. MILLER
by
Wright Brown Quinby & Clay
ATTYS

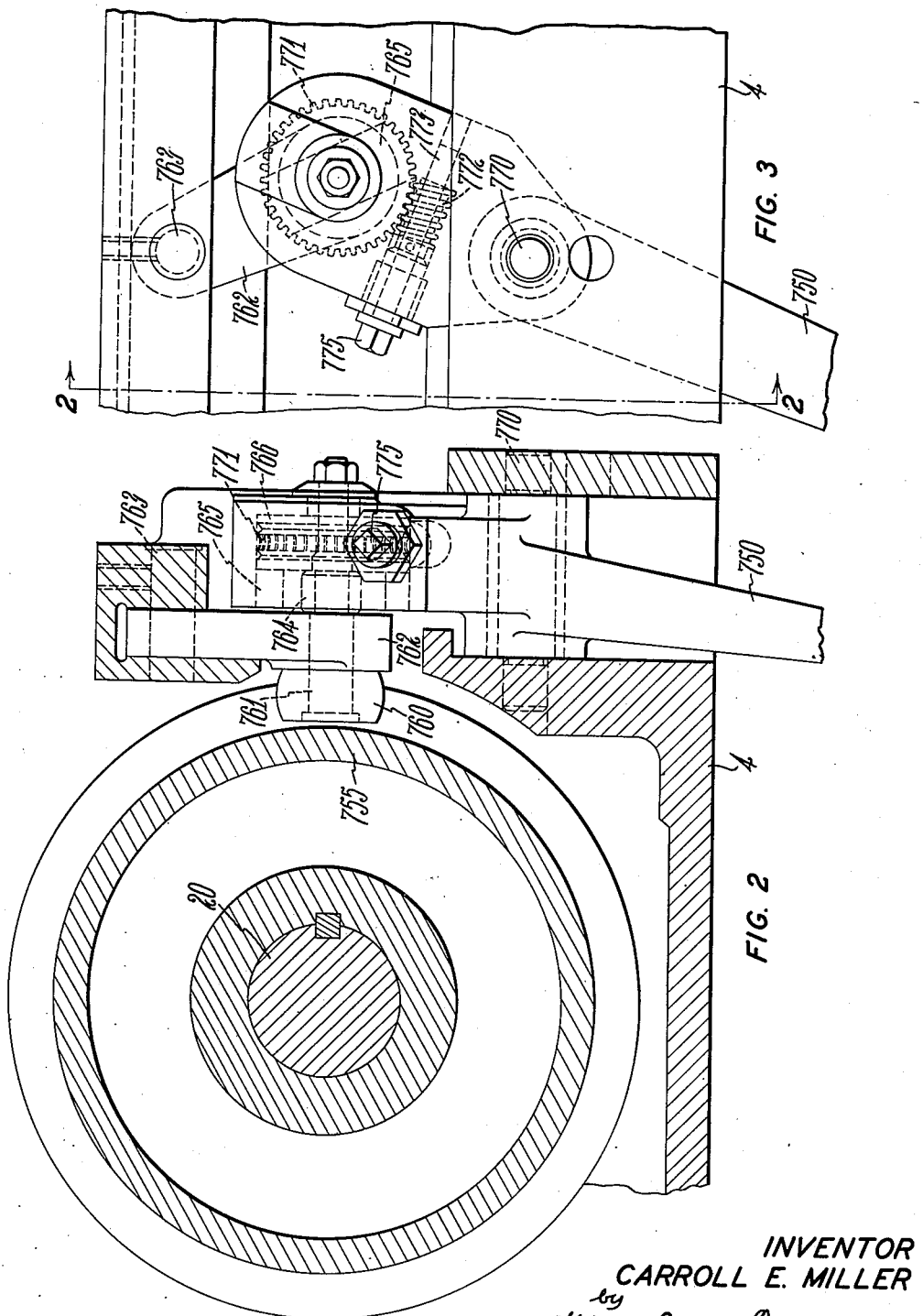

Dec. 16, 1952  C. E. MILLER  2,621,395
ADJUSTABLE END WORKING TOOL MECHANISM FOR LATHES
Original Filed Aug. 20, 1947  3 Sheets-Sheet 3
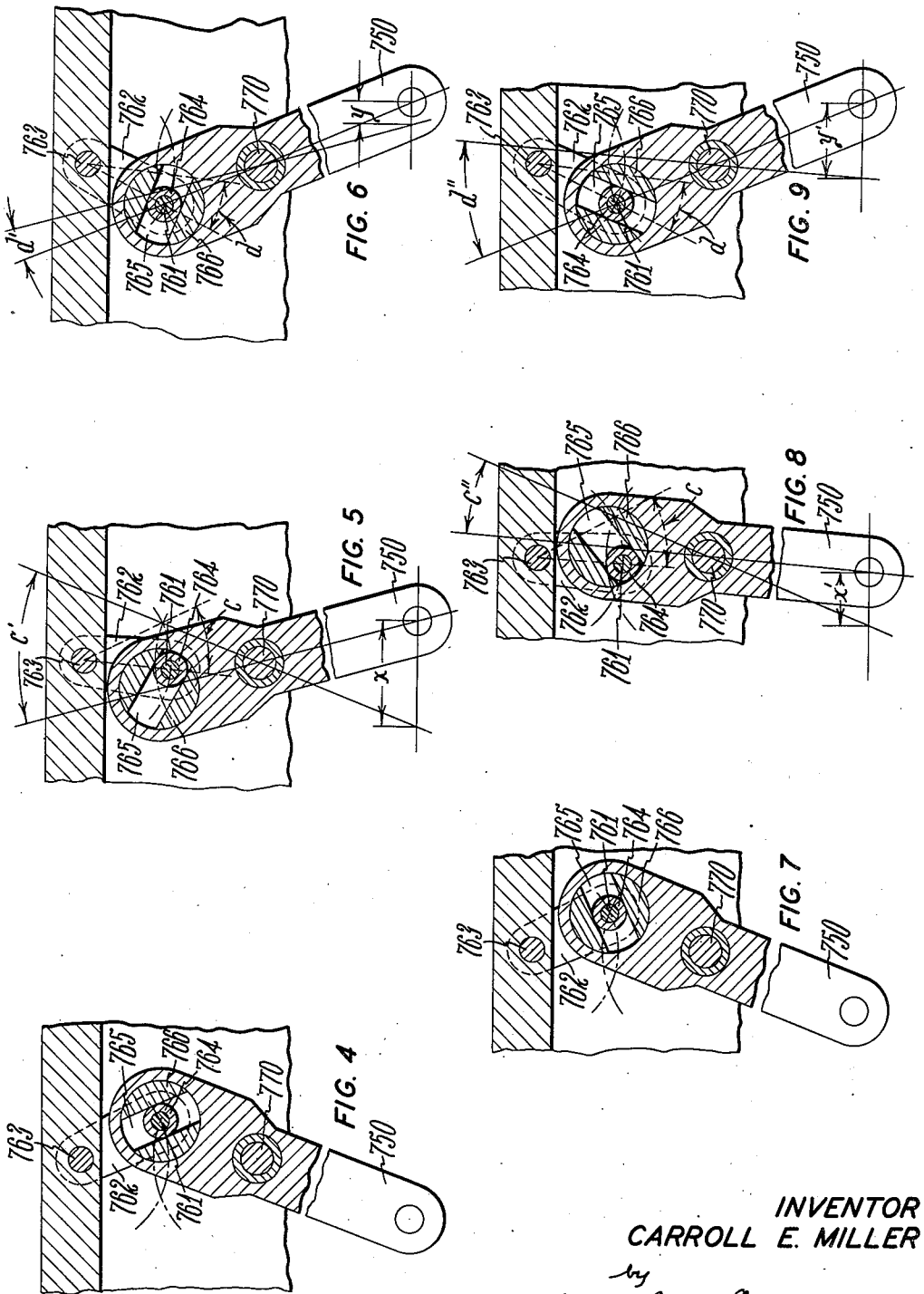
INVENTOR
CARROLL E. MILLER
by
Wright Brown Quinby & May
ATT'YS Patented Dec. 16, 1952

2,621,395

UNITED STATES PATENT OFFICE 2,621,395

ADJUSTABLE END WORKING TOOL MECHANISM FOR LATHES

Carroll E. Miller, Windsor, Vt., assignor to Cone Automatic Machine Company, Inc., Windsor, Vt., a corporation of Vermont Original application August 20, 1947, Serial No. 769,636. Divided and this application June 28, 1950, Serial No. 170,935

2 Claims. (Cl. 29—41)

This invention relates to end working tool mechanism for lathes, and has for an object to provide means for easily adjusting the extent of feed and retraction of such tools without requiring any change in actuating cams or other parts.

It also has for an object to provide adjustments of the extents of idle advance of such tools at relatively high speeds to bring the tools to nearly up to the operative position and the slower feed motion of the tools against the work.

For a complete understanding of this invention reference may be had to the accompanying drawings in which Figure 1 is a front elevation of the upper portion of a multiple spindle lathe embodying the invention.

Figure 2 is a fragmentary sectional view to a larger scale on lines 2—2 of Figure 1, the section line also appearing on Figure 3.

Figure 3 is a fragmentary front elevation, the cover being omitted, of the mechanism shown in Figure 2.

Figure 1:
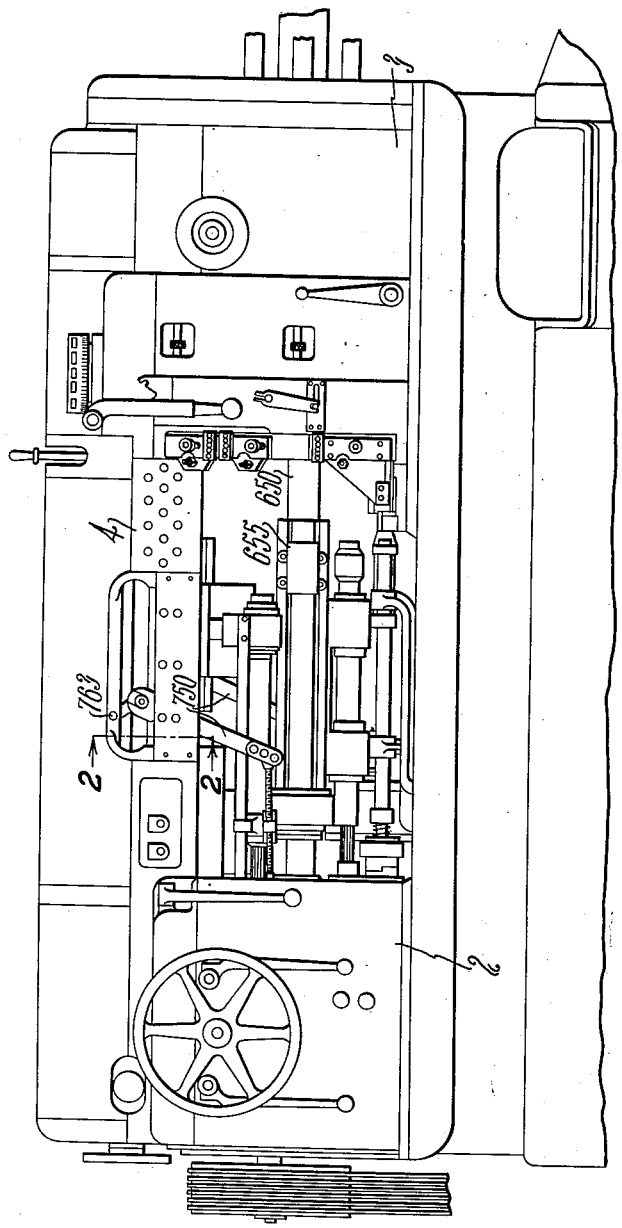

Figures 4 to 6, inclusive, are diagrammatic views illustrating extents of fast and slow tool motions for one adjustment.

Figures 7 to 9, inclusive, are views similar to Figures 4 to 6, respectively, but showing the effects on extents of fast and slow motion for a different adjustment.

Referring to the drawings, there is illustrated in Figure 1 a multiple spindle lathe provided with an indexing work spindle carrier, the carrier being mounted for turning motion within a column 3 and being provided with a plurality of rotary work-carrying spindles arranged in circular array about the indexing axis of the carrier. Within the upper frame member 4 at the upper end of the columns 2 and 3 is journaled a cam shaft 20 by rotation of which various operations of the machine are actuated and controlled. This cam drum is commonly driven at a relatively fast rate during a portion of each rotation when the tools are being returned or moved up to the work and at a relatively slow motion during feed of the tools into the work.

In so far as the present invention is concerned, this general arrangement of parts is old and well known. Coaxial with the spindle carrier is a tube 650 which surrounds a central shaft, one end of the tube 650 being fixed to the carrier to index therewith. Slidable along the tube 650 is a tool-carrying turret 655 and slidable lengthwise of the turret 655 in longitudinally extending T slots in its periphery may be various end working tools such as drills, reamers, and thread cutting mechanism for operation on work carried by the several work spindles. For a more comprehensive showing of the machine, reference may be had to my Patent No. 2,236,440 granted March 25, 1941, for Automatic Multiple Spindle Machine.

As it is sometimes desirable to move such tools independently of an axial motion of the tool turret itself, means may be provided for so moving the tools and such means forms the subject matter of the present invention and covers matter divided out from my patent application Serial No. 769,636 filed August 20, 1947, now abandoned, for Multiple Spindle Lathe.

This independent motion of the tools with respect to the tool-carrying turret may be desired, for example, in order to present a threading tool to the work, until such time as the thread cutting has been started, whereupon the threads automatically feed the tool forward, and when the threading has been accomplished and the threading tool is released to retract the tool from the work. This may be accomplished by the use of pivoted actuated arms such as are shown at 750, on Figures 1, 2 and 3. Such arms may be actuated by cams carried by the cam shaft 20, and as shown in Figure 2, such cams may be carried by a cam drum 755 (see Figure 2).

However, it is desirable that the effective throw of these arms may be adjusted without requiring the substitution of different cams on the drum 755, and to this end, means shown best in Figures 2 and 3, and diagrammatically in Figures 4 to 9, have been provided. The cams on the drum 755 act upon a cam follower 760 journaled on a post 761 carried by an arm 762 fulcrumed on a pivot pin 763 on a portion of the machine frame, the action of the cams on the drum 755 being to oscillate the arm 762. This arm 762 also carries, and if desired, journaled on an outward extension of the post 661, a follower roll 764 which rides in a diametrical guide slot 765 in a disk 766. This disk 766 is journaled in the upper end of the arm 750 above its fulcrum 770, and the disk 766 is mounted for angular adjustment, being provided at one side of the slot 765 with a worm wheel portion 771 with which meshes a worm 772 on a shaft 773 journaled transversely through the lever arm 750. The shaft 773 is provided with a squared extremity 775 for the reception of a wrench by which it may be turned to thereby adjust the angular position of the disk 766 and thereby adjust the angular position of its guide slot 765.

By angularly adjusting this disk 766 the effective extents of motion of the lower end of the actuating arm 750 may be varied. Figures 4 to 9 illustrate the effect of such angular adjustment. In Figures 4, 5, and 6, the disk 766 has the same angular relation to the arm 750, and in Figures 7, 8 and 9 a different angular relation of the disk 766 is illustrated. The rocking motion of the arm 762 produced by the cams on the drum 755 is, of course, throughout the same amplitude at all times, a portion of this amplitude representing the extent of swinging motion during fast motion of the machine and the remainder of its swing being produced during slow motion.

In Figures 4 and 7, the relationships between the arms 750 and the arm 762 are illustrated at the start of forward motion, the arm 762 being at one limit of motion. During the fast motion the arm 762 is swung to the positions shown in Figures 5 and 8 through the arc $c$, while the corresponding extent of angular motion of the arm 750 is represented by the arcs $c'$ and $c''$ in Figures 5 and 8, respectively. The corresponding linear motions afforded the end working tools by the swing of the arm 750 through the arcs $c'$ and $c''$ are shown at $x$ and $x'$, respectively.

In Figures 6 and 9 the arm 762 is shown at its opposite limit of swing than that shown in Figures 4 and 7, having moved through an additional slow motion angle $d$, which, of course, is the same regardless of the angular setting of the disk 766. The corresponding slow angular motion of the arm 750 is shown by the angles $d'$ and $d''$ in Figures 6 and 9 and the corresponding amounts of axial motion of the end working tools controlled thereby is shown by the distances $y$ and $y'$ (Figures 6 and 9). It will thus be seen that by varying the angular position of the disks 766, substantial variations in extents of feed motion of the end working tools during slow and fast motions of the machine may be produced, and the variations are continuous throughout the full ranges.

From the foregoing description of an embodiment of this invention, it should be evident to those skilled in the art that various changes and modifications might be made without departing from its spirit or scope.

I claim:

1. In combination, a tool carrier, a pivoted arm operatively connected to said carrier for moving said carrier by the rocking of said arm, means movable through a path of constant amplitude connected to move said arm, the connection between said moving means and arm comprising a disk rockably carried by said arm and provided with a diametrical guide portion, a member carried by said moving means and slidable in said guide portion, and means for adjusting the angular position of said disk.

2. In combination, a tool carrier, a pivoted arm operatively connected to said carrier for moving said carrier by the rocking of said arm, a disk carried by said arm spaced from its pivot, and angularly adjustable about its own axis, said disk having a way extending thereacross, a pivotally mounted link, a cam follower carried by said link and having a part slidably guided by said way, cam means for swinging said follower about the pivotal mounting of said link in fixed amplitude, and means for adjusting the angular position of said disk.

CARROLL E. MILLER.

REFERENCES CITED

The following references are of record in the file of this patent:

UNITED STATES PATENTS

| Number | Name | Date |
|---|---|---|
| 735,583 | Potter et al. | Aug. 4, 1903 |
| 1,005,652 | Millington et al. | Oct. 10, 1911 |
| 1,025,976 | Gulliford | May 14, 1912 |